United States Patent
Nishino et al.

(10) Patent No.: US 11,030,206 B2
(45) Date of Patent: Jun. 8, 2021

(54) DISPLAY METHOD AND DISPLAY APPARATUS

(71) Applicant: FUJITSU LIMITED, Kawasaki (JP)

(72) Inventors: Fumihito Nishino, Koto (JP); Hiroaki Morikawa, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 146 days.

(21) Appl. No.: 15/976,153

(22) Filed: May 10, 2018

(65) Prior Publication Data

US 2018/0329965 A1 Nov. 15, 2018

(30) Foreign Application Priority Data

May 15, 2017 (JP) .............................. JP2017-096376

(51) Int. Cl.
*G06F 16/248* (2019.01)
*G06F 16/951* (2019.01)
(Continued)

(52) U.S. Cl.
CPC ........ *G06F 16/248* (2019.01); *G06F 16/2457* (2019.01); *G06F 16/24534* (2019.01);
(Continued)

(58) Field of Classification Search
CPC ............. G06F 16/972; G06F 16/24578; G06F 16/25434; G06F 16/951; G06F 16/248; G06F 16/955
(Continued)

(56) References Cited

U.S. PATENT DOCUMENTS

| 7,043,716 B2* | 5/2006 | Zimmer ..................... G06F 8/30 715/234 |
| 7,912,842 B1* | 3/2011 | Bayliss ............... G06F 16/2471 707/749 |

(Continued)

FOREIGN PATENT DOCUMENTS

| JP | 2013-534673 | 9/2013 |
| JP | 2015-125742 | 7/2015 |

(Continued)

OTHER PUBLICATIONS

Peter Haase et al., "The Information Workbench as a Self-Service Platform for Developing Linked Data Applications", Proceedings of The World Wide Web Conference 2012 Developer Track, Apr. 18-20, 2012, Lyon, France (4 pages).

(Continued)

*Primary Examiner* — James Trujillo
*Assistant Examiner* — Fariborz Khoshnoodi
(74) *Attorney, Agent, or Firm* — Fujitsu Patent Center

(57) ABSTRACT

A memory stores a query template that describes a look-up condition for searching a database, by using a parameter to which identification information of a reference entity is assigned, and a reference point condition indicating a condition of an entity usable as the reference entity. A processor accepts designation of a first entity among a plurality of entities, detects a second entity that is reachable from the first entity via one or more links and satisfies the reference point condition, from among the plurality of entities, when the first entity does not satisfy the reference point condition, generates a query based on the detection result of the second entity and the query template, and retrieves data to be used in display processing from the database by using the query.

11 Claims, 15 Drawing Sheets

(51) Int. Cl.
  *G06F 16/955* (2019.01)
  *G06F 16/958* (2019.01)
  *G06F 16/2457* (2019.01)
  *G06F 16/2453* (2019.01)

(52) U.S. Cl.
  CPC .......... *G06F 16/951* (2019.01); *G06F 16/955* (2019.01); *G06F 16/958* (2019.01); *G06F 16/972* (2019.01)

(58) Field of Classification Search
  USPC .................................................. 707/720, 722
  See application file for complete search history.

(56) References Cited

U.S. PATENT DOCUMENTS

| | | | | |
|---|---|---|---|---|
| 7,925,620 | B1* | 4/2011 | Yoon | G06Q 10/109 707/609 |
| 9,354,948 | B2* | 5/2016 | Baeuerle | G06F 9/542 |
| 9,442,977 | B2* | 9/2016 | Falter | G06F 16/288 |
| 9,501,530 | B1* | 11/2016 | Jacobsson | G06F 16/951 |
| 10,110,617 | B2* | 10/2018 | Muddu | H04L 41/0893 |
| 2002/0194154 | A1* | 12/2002 | Levy | G16B 50/00 |
| 2006/0015483 | A1* | 1/2006 | Gownder | G06F 16/2438 |
| 2010/0121817 | A1* | 5/2010 | Meyer | G06F 16/972 707/623 |
| 2011/0238694 | A1* | 9/2011 | Carlsson | G06F 16/3331 707/769 |
| 2011/0320437 | A1* | 12/2011 | Kim | G06F 16/2457 707/722 |
| 2015/0154306 | A1* | 6/2015 | Lightner | G06F 16/9535 707/728 |
| 2015/0186476 | A1 | 7/2015 | Nishino et al. | |
| 2015/0186477 | A1 | 7/2015 | Nishino et al. | |
| 2016/0012105 | A1 | 1/2016 | Chang et al. | |
| 2016/0140439 | A1* | 5/2016 | Adderly | G06F 16/367 706/46 |
| 2018/0225375 | A1* | 8/2018 | Collins | G06F 16/9032 |
| 2018/0276344 | A1* | 9/2018 | Cochran | G16H 40/20 |

FOREIGN PATENT DOCUMENTS

| | | |
|---|---|---|
| JP | 2015-125747 | 7/2015 |
| JP | 2016-018566 | 2/2016 |

OTHER PUBLICATIONS

Peter Haase et al., "The Information Workbench as a Self-Service Platform for Linked Data Applications", Proceedings of The Second International Workshop on Consuming Linked Data (COLD2011), Oct. 23, 2011, Bonn, Germany (8 pages).

* cited by examiner

FIG. 6

RDF DATA

132

```
<http://lod4all.net/resource/corporate/jp/1020001071491>
    rdf:type  org:Organization, I4a:Corporate;
    <http://www.w3.org/2ns/org#identifier>  "1020001071491";
    <http://www.w3.org/2004/02/skos/core#prefLabel>  "F Corporation"@en;
    <http://www.w3.org/ns/org#hasRegisteredSite> [
        <http://www.w3.org/ns/org#siteAddress> [
            <http://schema.org/addressRegion>  "Kanagawa Prefecture"@en;
            <http://schema.org/addressLocality>  ""Kawasaki City, Nakahara Ward"@en;
            <http://schema.org/streetAddress>  ""Kamikodanaka 4-1-1"@en ]];
    <http://xmlns.com/foaf/0.1/primaryTopic>  <http://ja.dbpedia.org/resource/F>.

<http://ja.dbpedia.org/resource/F>
    <http://www.w3.org/2000/01/rdf-schema#label>  "F"@en.
```

FIG. 7

QUERY TEMPLATE
133

```
select ?number ?name ?pref ?city ?street where {
    %URI% <http://www.w3.org/ns/org#identifier> ?number;
          <http://www.w3.org/2004/02/skos/core#prefLabel> ?name;
          <http://www.w3.org/ns/org#hasRegisteredSite> ?site.
    ?site  <http://www.w3.org/ns/org#siteAddress> [
          <http:/schema.org/addressRegion> ?pref;
          <http://schema.org/addressLocality> ?city;
          <http://schema.org/steetAddress> ?street].
}
```

FIG. 8

SETTING TABLE
⸺ 134

| PAGE ID | DBpedia_Company |
|---|---|
| FOCUS TYPE | dbpedia-owl:Company |
| GADGET ID | HojinBasic |
| SEARCH CONDITION | ^<http://xmlns.com/foaf/0.1/primaryTopic> |
| END CONDITION | hasType(org:Organization) && hasType(l4a:Corporate) |

FIG. 9

QUERY
                                                                    ╭─135

```
select ?number ?name ?pref ?city ?street where {
    <http://lod4all.net/resource/corporate/jp/1020001071491>
            <http://www.w3.org/ns/org#identifier> ?number;
            <http://www.w3.org/2004/02/skos/core#prefLabel> ?name;
            <http://www.w3.org/ns/org#hasRegisteredSite> ?site.
    ?site  <http://www.w3.org/ns/org#siteAddress> [
            <http:/schema.org/addressRegion> ?pref;
            <http://schema.org/addressLocality> ?city;
            <http://schema.org/steetAddress> ?street].
}
```

FIG. 10

QUERY RESULT TABLE   136

| number | "F Corporation"@en |
| name | "Kanagawa Prefecture"@en |
| pref | "Kawasaki City, Nakahara Ward"@en |
| city | "Kawasaki City, Nakahara Ward"@en |
| street | "Kamikodanaka 4-1-1"@en |

FIG. 13

QUERY TEMPLATE
                                                    ⌐137

```
select ?number ?name ?pref ?city ?street where {
    %URI% ^<http://xmlns.com/foaf/0.1/primaryTopic> ?uri.
    ?uri   <http://www.w3.org/ns/org#identifier> ?number;
           <http://www.w3.org/2004/02/skos/core#prefLabel> ?name;
           <http://www.w3.org/ns/org#hasRegisteredSite> ?site.
    ?site  <http://www.w3.org/ns/org#siteAddress> [
              <http:/schema.org/addressRegion> ?pref;
              <http://schema.org/addressLocality> ?city;
              <http://schema.org/steetAddress> ?street].
}
```

FIG. 14

QUERY
⎯ 138

```
select ?number ?name ?pref ?city ?street where {
    <http://ja.dbpedia.org/resource/F>
            ^<http://xmlns.com/foaf/0.1/primaryTopic> ?uri.
    ?uri    <http://www.w3.org/ns/org#identifier> ?number;
            <http://www.w3.org/2004/02/skos/core#prefLabel> ?name;
            <http://www.w3.org/ns/org#hasRegisteredSite> ?site.
    ?site   <http://www.w3.org/ns/org#siteAddress> [
                <http:/schema.org/addressRegion> ?pref;
                <http://schema.org/addressLocality> ?city;
                <http://schema.org/steetAddress> ?street].
}
```

DISPLAY METHOD AND DISPLAY APPARATUS

CROSS-REFERENCE TO RELATED APPLICATION

This application is based upon and claims the benefit of priority of the prior Japanese Patent Application No. 2017-096376, filed on May 15, 2017, the entire contents of which are incorporated herein by reference.

FIELD

The embodiments discussed herein relate to a display method and a display apparatus.

BACKGROUND

There is a technology called dynamic publishing, as a technology that dynamically generates a web page. The dynamic publishing is sometimes called with another name, such as dynamic semantic publishing, dynamic delivery system, and data-driven content service. In the dynamic publishing, display content of a web page is dynamically generated by retrieving data from a database in accordance with a request and applying the data to a display template, instead of directly describing the display content of the web page as a static file. The display content generated by the dynamic publishing can include a pictorial element, such as a graph, a map with a pin, and a tabulated list including data.

The dynamic publishing sometimes uses linked data described in accordance with the resource description framework (RDF), as a database. The linked data includes a plurality of entities representing real bodies, such as a company and a person, and a plurality of links representing the relationships between these entities. When a user designates one entity of interest (hereinafter, referred to as "focus"), the data relevant to the entity is extracted by tracing one or more links from the entity. A query described by using a query language, such as SPARQL (SPARQL Protocol and RDF Query Language), is used to extract target data from a database. A query template is sometimes prepared in advance as a form of query. The query template sometimes describes a look-up condition by using a parameter (argument) to which the identification information of a focused entity is assigned.

For example, there is proposed a look-up device that retrieves a plurality of types of data related to each other from a database and generates a web page including a plurality of display regions corresponding to the plurality of types of data. The proposed look-up device stores three query templates as forms of query used to retrieve data from the database. A first query template is to retrieve the total ordered price of a company designated by a user. A second query template is to retrieve companies related to the company designated by the user. A third query template is to retrieve the total ordered price of a company group including the company designated by the user and the related companies. When one company is designated by the user, the look-up device generates three queries by using the identification information of the designated company and the three query templates, and extracts three types of data by executing each of the generated three queries.

Moreover, there is proposed a system that converts a query described in a natural language input from a user to a query described in an object query language (OQL) by using a natural language processing technology and retrieves data from an ontology knowledge database by using the OQL query.

See, for example, Japanese Laid-open Patent Publication Nos. 2015-125747 and 2016-18566.

By the way, when the user puts a focus on a certain entity, information relevant to the entity is preferable to be presented, and even the information relevant to another entity having a predetermined link relationship with the above entity is preferable to be presented in some cases. Conventionally, a query template for tracing the predetermined link from the focused entity, extracting data relevant to the other entity, and presenting the relevant information has been created and utilized. However, even if the other entity is the same, this method necessitates preparation of individual query templates for different links with the focused entity, and there is a problem of reduced software efficiency in presenting and visualizing the relevant information.

SUMMARY

According to one aspect, there is provided a non-transitory computer-readable storage medium storing a computer program that causes a computer to execute a process including: accepting designation of a first entity included in a database that includes a plurality of entities and a plurality of links indicating relationships between the plurality of entities; acquiring a query template that describes a look-up condition for searching the database by using a parameter to which identification information of a reference entity is assigned, and a reference point condition indicating a condition of an entity usable as the reference entity; detecting a second entity that is reachable from the first entity via one or more links and satisfies the reference point condition, from among the plurality of entities, when the first entity does not satisfy the reference point condition; generating a query based on a detection result of the second entity and the query template; and retrieving data to be used in display processing from the database by using the query.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates a description example of the RDF data.

FIG. 7 illustrates an example of a query template.

FIG. 8 illustrates an example of a setting table.

FIG. 9 illustrates a query example of the second embodiment.

FIG. 10 illustrates an example of a query result table.

FIG. 13 illustrates a rewrite example of a query template.

FIG. 14 illustrates a query example of a third embodiment.

DESCRIPTION OF EMBODIMENTS

Figure 1:
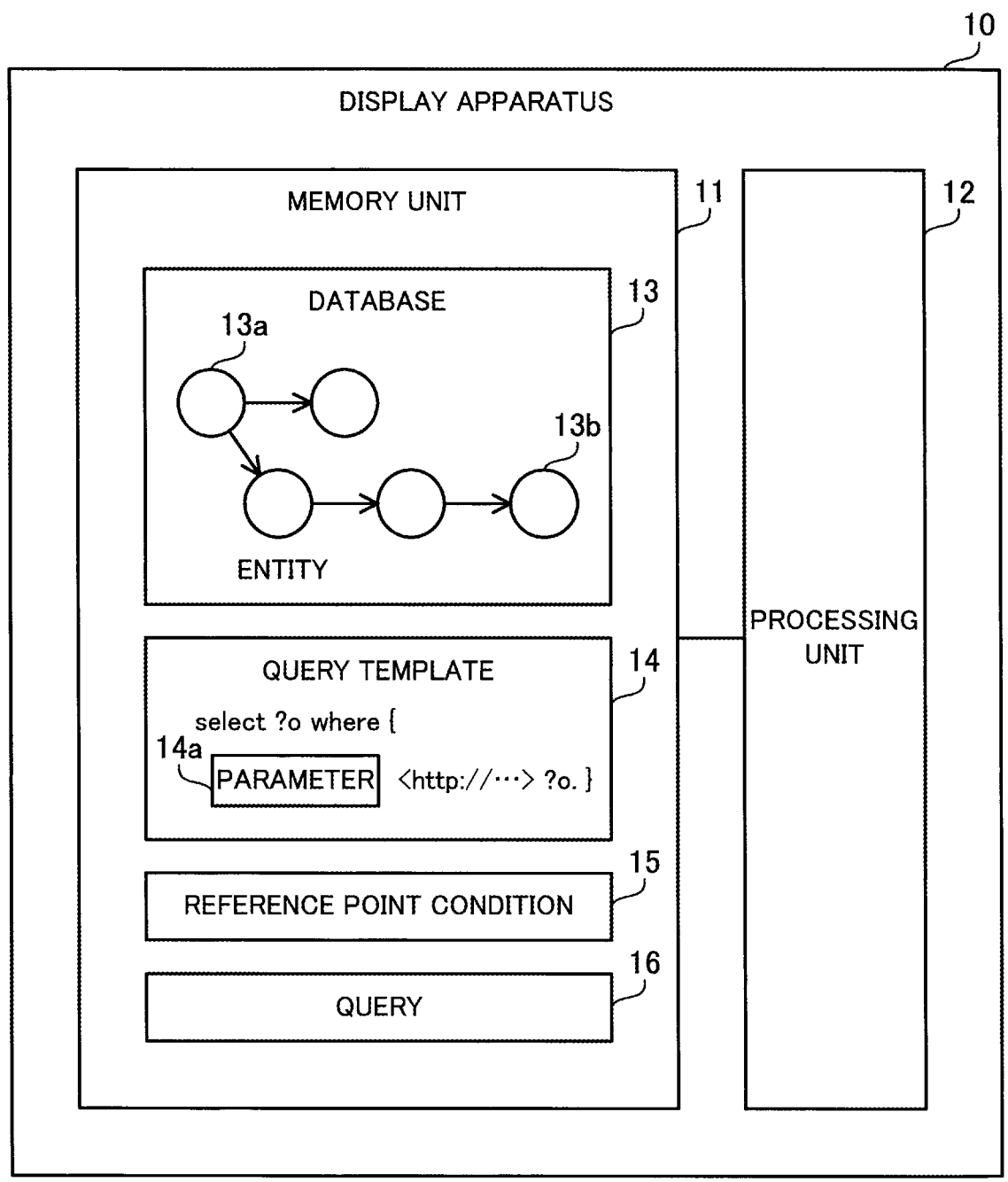
FIG. 1 is a diagram for describing a display apparatus of a first embodiment.

Several embodiments will be described below with reference to the accompanying drawings, wherein like reference numerals refer to like elements throughout.

First Embodiment

A first embodiment will be described. FIG. 1 is a diagram for describing a display apparatus of the first embodiment.

A display apparatus 10 of the first embodiment retrieves non-pictorial data, such as numerical values and character strings, from a database, and visualizes the retrieval result by generating and displaying display content including pictorial data, such as a graph, a map with a pin, and a tabulated list including numerical values and character strings. The display processing executed by the display apparatus 10 may be referred to as dynamic publishing. The display apparatus 10 may be a terminal device operated by a user, and may be a server apparatus that transmits display content to a terminal device in accordance with a request from the terminal device.

The display apparatus 10 includes a memory unit 11 and a processing unit 12. The memory unit 11 is a volatile memory device, such as a random access memory (RAM), or a non-volatile memory device, such as a hard disk drive (HDD) and a flash memory. The processing unit 12 is a processor, such as a central processing unit (CPU) and a digital signal processor (DSP), for example. However, the processing unit 12 may include an application specific electronic circuit, such as an application specific integrated circuit (ASIC) and a field programmable gate array (FPGA). The processor executes a program stored in a memory such as a RAM (which may be the memory unit 11). For example, the processor executes a display program. Note that a group of processors may be referred to as "multiprocessor" or simply "processor".

The memory unit 11 stores a database 13. The database 13 includes a plurality of entities representing real bodies, such as a company and a person, and a plurality of links representing relationships between the entities, such as inclusion relationship, possession relationship, and equivalence relationship. For example, the database 13 is linked data described in accordance with the RDF, and may be linked open data which is publicly available linked data. The database 13 may include a plurality of data sets created by different creators and linked to each other. Note that the database 13 may be stored outside the display apparatus 10. Also, the display apparatus 10 may receive at least a part of the database 13 from the outside.

Moreover, the memory unit 11 stores a query template 14. The query template 14 is a form of query (retrieval request statement) for retrieving data for display processing from the database 13. In the query template 14, a look-up condition for searching the database 13 is described by using a parameter 14a. The look-up condition indicates a method for collecting data relevant to a reference entity from the database 13. The parameter 14a is described with a predetermined character string, such as "%URI%", and identification information of the reference entity is assigned to the parameter 14a. The identification information of the entity is a uniform resource identifier (URI) or an internationalized resource identifier (IRI), for example. When the identification information of a specific entity is assigned to the parameter 14a, an executable query for retrieving target data relevant to the entity is created.

In addition, the memory unit 11 stores a reference point condition 15. The reference point condition 15 indicates a condition of an entity that is usable as a reference entity in the query template 14. For example, the reference point condition 15 specifies an entity type that is usable as the reference entity, such as a corporate entity included in a corporate number data set. The memory unit 11 may additionally store a search condition indicating a condition of a link usable in detecting an entity that satisfies the reference point condition 15 in the database 13.

The processing unit 12 accepts designation of an entity 13a (first entity) from among the entities included in the database 13. A user designates the entity 13a on which the user puts a focus at the present moment, for example. Then, the processing unit 12 determines whether the designated entity 13a satisfies the reference point condition 15. For example, the processing unit 12 determines whether the type of the entity 13a is identical with the type specified in the reference point condition 15.

When the entity 13a does not satisfy the reference point condition 15, the processing unit 12 detects an entity 13b (second entity) that exists around the entity 13a, from among the entities included in the database 13. The entity 13b is reachable from the designated entity 13a via one or more links and satisfies the reference point condition 15. The processing unit 12 may limit the entity 13b to an entity that is reachable only by tracing links that satisfy the search condition stored in the memory unit 11.

The processing unit 12 generates a query 16 on the basis of the detection result of the entity 13b and the query template 14. The query 16 is to collect the data relevant to the entity 13b, not the designated entity 13a, from the database 13.

For example, the processing unit 12 generates the query 16 by assigning the identification information of the detected entity 13b to the parameter 14a of the query template 14. For another example, the processing unit 12 generates path information indicating a path that reaches the entity 13b from the entity 13a, and then generates the query 16 on the basis of the identification information of the entity 13a, the path information, and the query template 14. The processing unit 12 may rewrite the query template 14 to allow usage of the identification information of the entity 13a, by replacing the parameter 14a with a variable unused in the query template 14 and inserting a statement that associates another parameter, the path information, and the variable. In this case, the identification information of the entity 13a may be assigned to the parameter included in the rewritten query template.

The processing unit 12 retrieves data to be used in display processing from the database 13, by using the generated query 16. For example, the processing unit 12 visualizes the retrieved data by applying the retrieved data to a display template, in order to generate display content, such as a graph, a map with a pin, and a tabulated list including numerical values and character strings. The display content may be displayed in a web page. For example, the web page including the display content is displayed on a screen of the display apparatus 10 or a screen of an external terminal device. Note that the display apparatus 10 may transmit the display content generated from the retrieved data to the outside of the display apparatus 10, and may transmit the retrieved data to the outside of the display apparatus 10.

When the designated entity 13a does not satisfy the reference point condition 15, the display apparatus 10 of the first embodiment fails to use the query template 14 as it is, in data retrieval. Thus, the entity 13b that satisfies the reference point condition 15 is detected from around the designated entity 13a, and the data relevant to the entity 13b is retrieved from the database 13 on the basis of the detection result of the entity 13b and the query template 14.

Thereby, even if the focused entities are different, the query template 14 is commonly utilizable to present the information relevant to the same entity, making it needless to prepare different query templates in advance for different focused entity types. Thus, the software allowing the user to put a focus on various entity types is implemented by utilizing the existing query template 14, thereby improving the software efficiency in retrieving and visualizing data.

Second Embodiment

Figure 2:
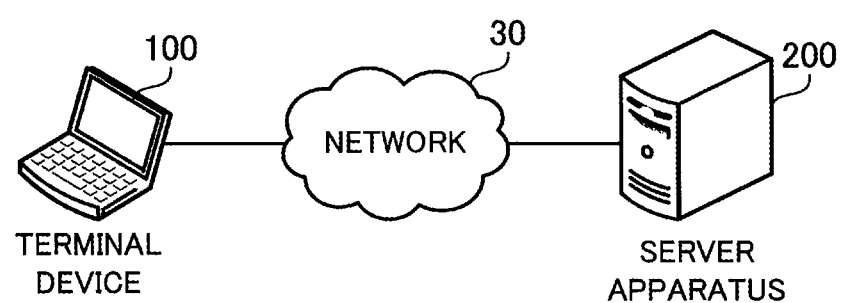
FIG. 2 illustrates an example of an information processing system of a second embodiment.

Next, a second embodiment will be described. FIG. 2 illustrates an example of an information processing system of the second embodiment.

The information processing system of the second embodiment includes a terminal device 100 and a server apparatus 200. The terminal device 100 and the server apparatus 200 are capable of communicating with each other via a network 30. The network 30 is a broad area data communication network, such as the Internet. The terminal device 100 is a client computer used by a user. The server apparatus 200 is a server computer accessible from the terminal device 100.

The terminal device 100 dynamically generates and displays a web page by dynamic publishing in accordance with user operation. Detection of the user operation and display of the web page are performed on a web browser installed in the terminal device 100, for example. One or more gadgets are located on a web page. Each gadget is a module that generates a unit of display content, and includes a query template for retrieving data from a database and a visualization program for generating display content from the retrieved data. The visualization program is implemented as a client side script, for example. The database includes RDF data described in accordance with the RDF. This RDF data may be referred to as linked data or linked open data.

Visualization target data retrieved from the database includes non-pictorial data, such as numerical values and character strings. The display content generated by the visualization program includes pictorial data, such as a graph indicating a relationship between a plurality of numerical values, a map with a pin indicating a position, and a tabulated list including numerical values and character strings. The graph is a line graph (line chart), a bar graph (bar chart), a bubble chart, a radar chart, or the like. The display content is generated by applying the retrieved data to a display template. Note that a raster image (bit map image), which is a collection of pixels, may be generated as the pictorial data, and a vector image, which is a collection of lines defined by equations or the like, may be generated as the pictorial data.

The terminal device 100 stores setting information that defines a web page in which one or more gadgets are located. The setting information may be directly input to the terminal device 100 in advance, and may be downloaded to the terminal device 100 from the server apparatus 200. In addition, the terminal device 100 stores one or more gadgets for dynamic publishing. The gadgets may be stored in the terminal device 100 in advance, and may be downloaded to the terminal device 100 from the server apparatus 200. In addition, the terminal device 100 stores at least a part of RDF data for dynamic publishing. At least a part of RDF data may be stored in the terminal device 100 in advance, and may be downloaded to the terminal device 100 from the server apparatus 200 as needed.

In response to a request from the terminal device 100, the server apparatus 200 supplies various types of information for dynamic publishing to the terminal device 100, in some cases. For example, the server apparatus 200 may transmit the above setting information, the gadgets, or the RDF data to the terminal device 100 in response to a request from the terminal device 100.

Note that a plurality of server apparatuses may be connected to the network 30. The terminal device 100 may download a plurality of gadgets and a plurality of RDF data sets from different server apparatuses. In addition, in the second embodiment, the terminal device 100 retrieves and visualizes data. In contrast, it may be such that the server apparatus 200 retrieves data and transmits the retrieval result to the terminal device 100 and the terminal device 100 visualizes the received retrieval result. Moreover, it may be such that the server apparatus 200 retrieves and visualizes data and transmits display content to the terminal device 100, and the terminal device 100 displays the received display content.

Figure 3:
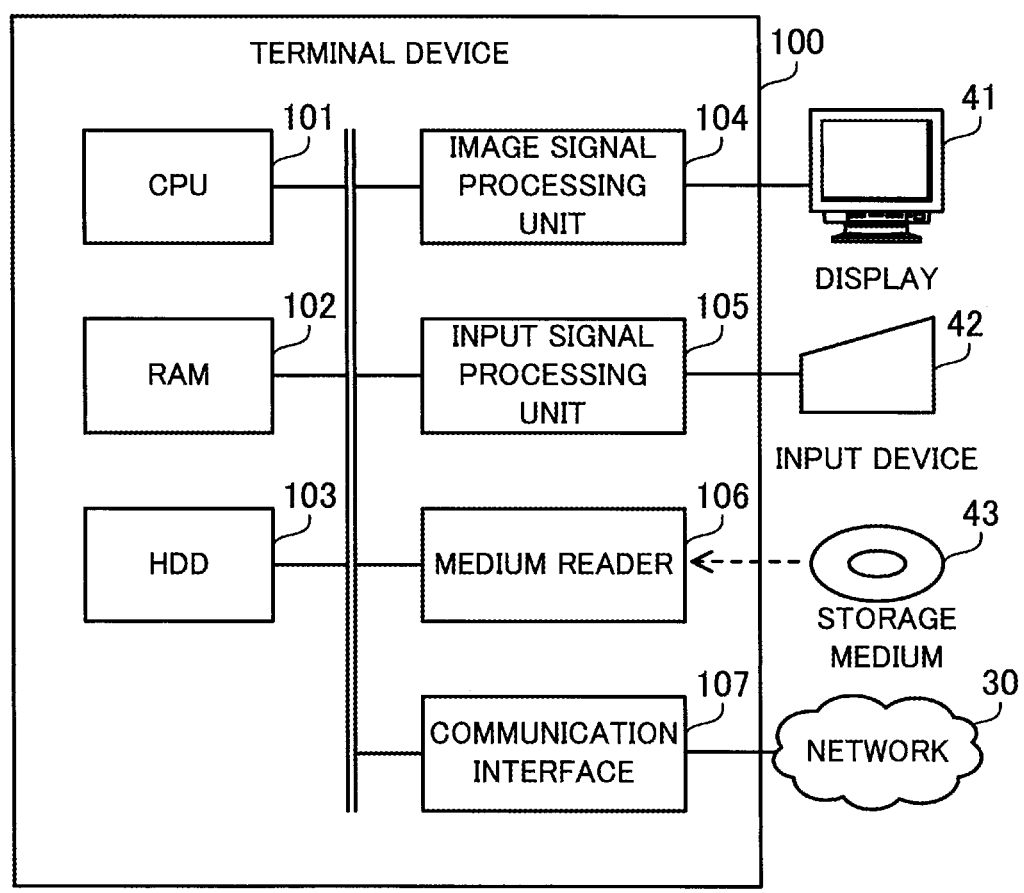
FIG. 3 is a block diagram illustrating a hardware example of a terminal device.

FIG. 3 is a block diagram illustrating a hardware example of a terminal device.

The terminal device 100 includes a CPU 101, a RAM 102, an HDD 103, an image signal processing unit 104, an input signal processing unit 105, a medium reader 106, and a communication interface 107. The server apparatus 200 may be implemented by using the same hardware as the terminal device 100. Note that the CPU 101 corresponds to the processing unit 12 of the first embodiment. The RAM 102 or the HDD 103 corresponds to the memory unit 11 of the first embodiment.

The CPU 101 is a processor including a computing circuit that executes commands of programs. The CPU 101 loads at least a part of programs and data stored in the HDD 103 into the RAM 102, and executes the programs. Note that the CPU 101 may include a plurality of processor cores, and the terminal device 100 may include a plurality of processors, and the following process may be executed in parallel by using the plurality of processors or processor cores. Note that a group of processors may be referred to as "multiprocessor" or simply "processor".

The RAM 102 is a volatile semiconductor memory that temporarily stores programs to be executed by the CPU 101 and data that the CPU 101 uses in computation. Note that the terminal device 100 may include a memory of a type other than the RAM, and may include a plurality of memories.

The HDD 103 is a non-volatile memory device for storing software programs, such as an operating system (OS) and application software, and data. Note that the terminal device 100 may include a memory device of another type, such as a flash memory and a solid state drive (SSD), and may include a plurality of non-volatile memory devices.

The image signal processing unit 104 outputs an image to a display 41 connected to the terminal device 100, in accordance with a command from the CPU 101. A display of any type, such as a cathode ray tube (CRT) display, a liquid crystal display (LCD), a plasma display, or an organic electro-luminescence (OEL) display, may be used as the display 41.

The input signal processing unit 105 acquires an input signal from an input device 42 connected to the terminal device 100, and outputs the input signal to the CPU 101. A pointing device, such as a mouse, a touch panel, a touch pad, and a trackball, a keyboard, a remote controller, a button switch, and the like may be used as the input device 42. Also, a plurality of types of input devices may be connected to the terminal device 100.

The medium reader 106 is a reader device that reads programs and data stored in a storage medium 43. The storage medium 43 is, for example, a magnetic disk, an optical disc, a magneto-optical disk (MO), a semiconductor memory, or the like. The magnetic disk includes a flexible disk (FD) and an HDD. The optical disc includes a compact disc (CD) and a digital versatile disc (DVD).

For example, the medium reader 106 copies the programs and data read from the storage medium 43 to another storage medium, such as the RAM 102 and the HDD 103. The read programs are executed by the CPU 101, for example. Note that the storage medium 43 may be a portable storage medium, which may be used in distribution of programs and data. Also, the storage medium 43 and the HDD 103 may be referred to as computer-readable storage medium.

The communication interface 107 is connected to the network 30 and communicates with the server apparatus 200 via the network 30. For example, the communication interface 107 is a wired communication interface connected by a cable to a communication device, such as a switch. However, the communication interface 107 may be a wireless communication interface connected to a base station via a wireless link.

Figure 4:
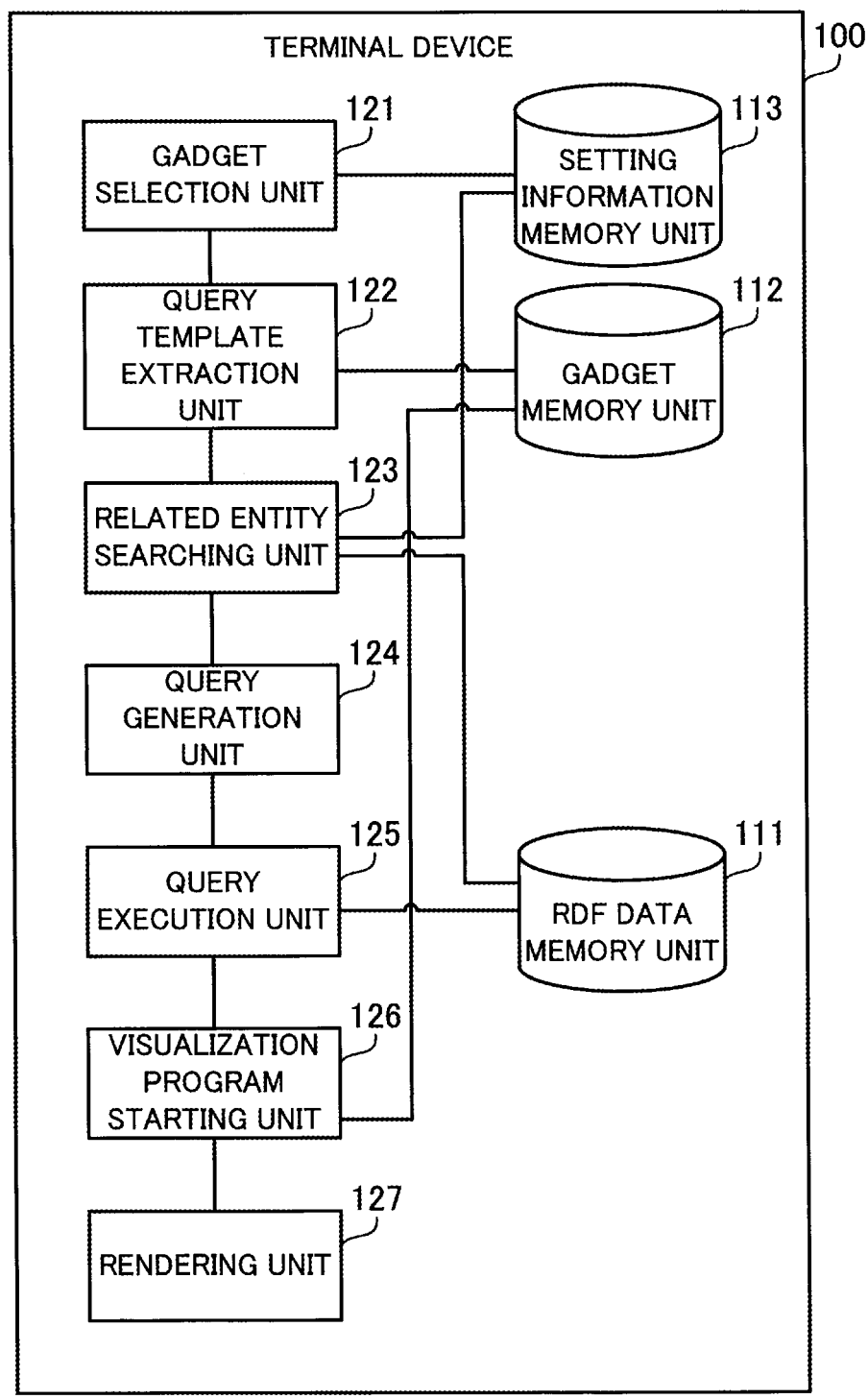
FIG. 4 is a block diagram illustrating a function example of the terminal device.

FIG. 4 is a block diagram illustrating a function example of a terminal device.

The terminal device 100 includes an RDF data memory unit 111, a gadget memory unit 112, and a setting information memory unit 113. In addition, the terminal device 100 includes a gadget selection unit 121, a query template extraction unit 122, a related entity searching unit 123, a query generation unit 124, a query execution unit 125, a visualization program starting unit 126, and a rendering unit 127. The RDF data memory unit 111, the gadget memory unit 112, and the setting information memory unit 113 are implemented by using a memory region of the RAM 102 or the HDD 103, for example. The gadget selection unit 121, the query template extraction unit 122, the related entity searching unit 123, the query generation unit 124, the query execution unit 125, the visualization program starting unit 126, and the rendering unit 127 are implemented by using programs executed by the CPU 101, for example.

The RDF data memory unit 111 stores RDF data, which is linked data described in accordance with the RDF. The RDF data includes entities representing real bodies, such as a company and a person, and links representing the relationships between the entities. The RDF data is expressed by a directed graph composed of the entities (nodes) and the links (edges) between the entities. Identification information, such as URI and IRI, is given to each entity, and the identification information is described as "URI" in the second embodiment. The RDF data expresses a fact such as "the head office location of A corporation is B", by a triple composed of a subject, a predicate, and an object. In the directed graph, an edge corresponding to a predicate extends from a node corresponding to a subject toward a node corresponding to an object.

The RDF data memory unit 111 stores a plurality of data sets from different information sources at least partially. The data sets are sometimes coupled by links. In the following description, the company information in the DBpedia and the corporate number data set of the National Tax Agency are used as examples of the data set. The entirety or a part of the data set may be stored in advance in the RDF data memory unit 111. Also, the entirety or a part of the data set may be downloaded from the server apparatus 200 or another server apparatus as appropriate, depending on the situation of RDF data reference. Different data sets are sometimes downloaded from different server apparatuses.

The gadget memory unit 112 stores a plurality of gadgets, which may be located in a web page. Each gadget includes a query template and a visualization program. One or more gadgets may be stored in advance in the gadget memory unit 112. Also, a gadget may be downloaded from the server apparatus 200 or another server apparatus as appropriate, depending on the situation of the gadget usage. Different gadgets are downloaded from different server apparatuses, in some cases.

The query template is a form of query including a parameter to which the URI of an entity is assigned. A query generated from the query template is a retrieval request statement for retrieving the data relevant to the entity indicated by the above URI from among the RDF data stored in the RDF data memory unit 111, and is described in SPARQL. Each query template is created, assuming that the URI of an entity of a predetermined type is assigned to the query template. The visualization program is a script program which is called after data retrieval to visualize the data retrieved in accordance with the query template. Each visualization program converts data of a predetermined type to display content of a predetermined type.

The setting information memory unit 113 stores setting information indicating how to use a gadget. The setting information is input to the terminal device 100 by using the input device 42, for example. However, the setting information may be downloaded from the server apparatus 200 or another server apparatus. The setting information includes information indicating the location of the gadget in the web page. One or more gadgets may be located in a web page. In addition, the setting information includes information that associates the type of the entity (entity type) designated by the user and the gadget that responds to the designation of the entity. In some cases, two or more gadgets respond to the designation of one entity, and two or more sets of display content are generated and displayed side by side.

In addition, the setting information includes information for absorbing the difference between the type of the entity assumed by the query template included in the gadget and the type of the entity designated by the user on the web page. When the type of the entity that the user puts a focus on (sometimes referred to as focused entity) differs from the type assumed by the query template, the query template is unable to be used as it is. Thus, as described below, the terminal device 100 searches the RDF data memory unit 111 storing the RDF data, for an appropriate entity existing around the focused entity, and applies the appropriate entity to the query template, in some cases. The entity which is applied to the query template, instead of the focused entity, may be referred to as a related entity or a provisional focused entity. The setting information includes information regarding a method for searching for the related entity from the focused entity.

The gadget selection unit 121 detects user operation on the web page and acquires the URI of the entity designated by the user (the URI of the focused entity). Usually, one URI of one focused entity is acquired at a time. However, a plurality of URIs corresponding to a plurality of focused entities (collection entity sequence) may be acquired at a time. In that case, the following process is executed for each focused entity, for example. The gadget selection unit 121 selects a gadget corresponding to the type of the designated focused entity, with reference to the setting information stored in the setting information memory unit 113. When a plurality of gadgets are selected, the following process is executed for each gadget.

The query template extraction unit 122 extracts the query template included in the gadget selected by the gadget selection unit 121 from the gadget memory unit 112.

The related entity searching unit 123 determines whether the designated focused entity satisfies an end condition set for the gadget, with reference to the setting information stored in the setting information memory unit 113. The end condition defines the entity assumed by the parameter of the query template, and the search for the related entity ends when the end condition is satisfied. When the focused entity satisfies the end condition, the focused entity is assumed as the related entity.

On the other hand, when the focused entity does not satisfy the end condition, the related entity searching unit 123 searches the RDF data memory unit 111 storing the RDF data, for a related entity that exists around the focused entity and satisfies the end condition. In this case, the related entity searching unit 123 limits the search area in accordance with the search condition set for the gadget, with reference to the setting information stored in the setting information memory unit 113. The search condition defines links that are allowed to be traced from the focused entity at the time of searching. Limiting the search area reduces the risk of selecting the related entity unintended by the user.

The query generation unit 124 generates a query on the basis of the search result of the related entity by the related entity searching unit 123 and the query template extracted by the query template extraction unit 122. In the second embodiment, the query generation unit 124 assigns the URI of the related entity to the parameter of the query template. However, as described later, the query may be generated by another method, such as rewriting the query template.

The query execution unit 125 generates a retrieval result by executing the query generated by the query generation unit 124 to the RDF data stored in the RDF data memory unit 111. The RDF data has a graph structure (network structure) logically, while the retrieval result generated by the query execution unit 125 has a table structure including one or more columns (data items) and one or more rows (record) logically in some cases. The data items to be included in the retrieval result is defined in the query template for generation of the query.

The visualization program starting unit 126 extracts the visualization program included in the gadget selected by the gadget selection unit 121 from the gadget memory unit 112. Then, the visualization program starting unit 126 supplies the retrieval result generated by the query execution unit 125 to the visualization program, in order to start the visualization program. The visualization program is executed to generate the display content of the type according to the gadget. The visualization program uses a display template, such as a format of a graph, a map, and a format of a tabulated list, in some cases.

When the retrieval result includes data items indicating numerical values, the display content is sometimes a graph, such as a line graph, a bar graph, a bubble chart, and a radar chart, which facilitate comparison of numerical values between records. When the retrieval result includes a data item indicating position coordinates, the display content is sometimes a map with one or more pins corresponding to one or more records. When the retrieval result includes a plurality of data items indicating numerical values and character strings, the display content is sometimes a tabulated list including the columns corresponding to the data items and the rows corresponding to one or more records.

The rendering unit 127 acquires the generated display content from the visualization program starting unit 126. The rendering unit 127 performs graphics processing (rendering) of the web page including the display content, and updates the display of the web page. The web page including the display content is displayed on the display 41.

Figure 5:
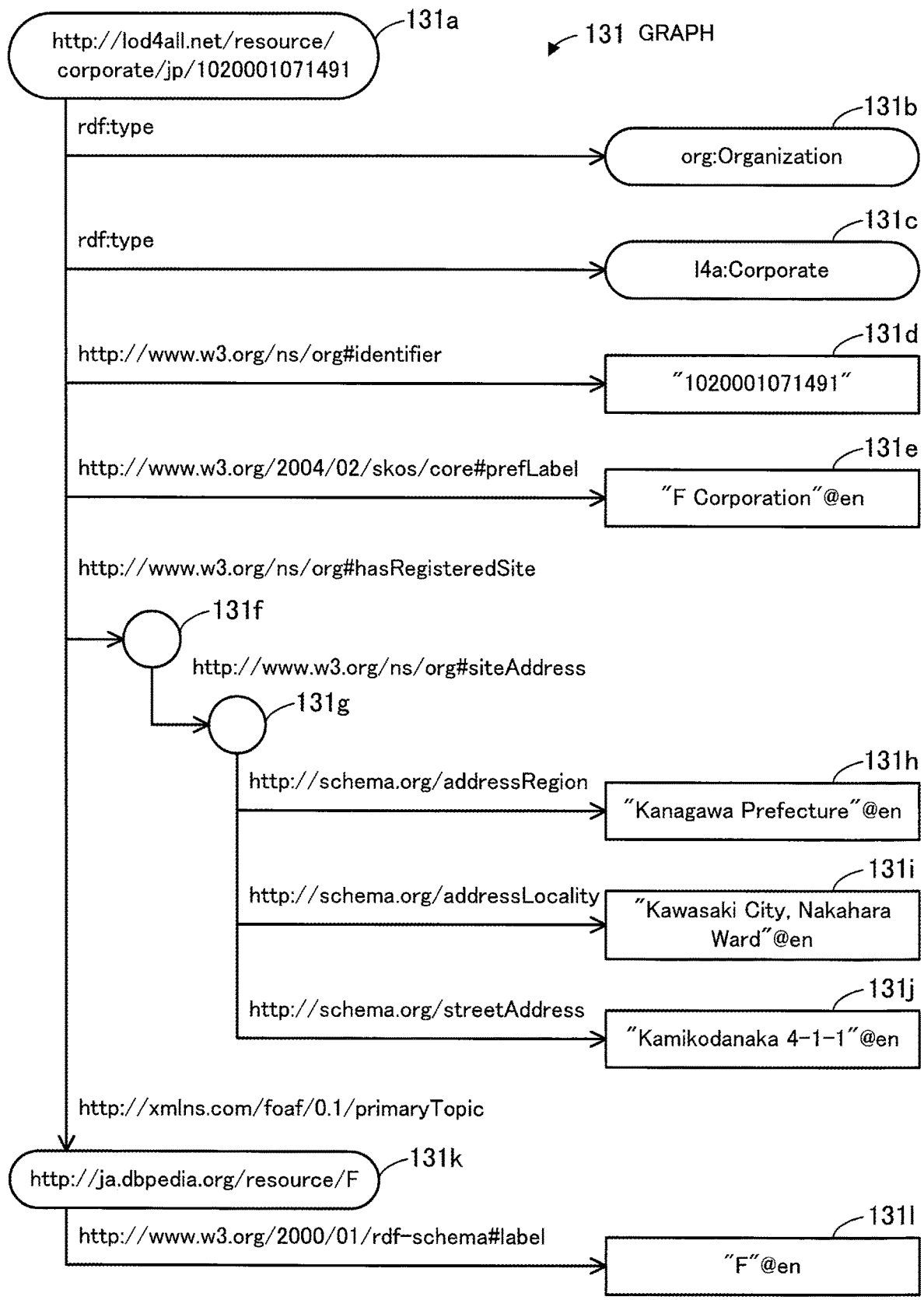
FIG. 5 illustrates a graph example representing RDF data.

FIG. 5 illustrates a graph example representing RDF data. A graph 131 is a part of the graph expressed by the RDF data. The graph 131 includes nodes 131a, 131b, 131c, 131d, 131e, 131f, 131g, 131h, 131i, 131j, 131k, and 131l.

The node 131a corresponds to the entity of a specific company included in the corporate number data set, and is identified by one URI. The node 131b corresponds to an entity of an organization type, and is identified by one URI. The nodes 131a and 131b are connected by an edge from the node 131a to the node 131b. This edge corresponds to a link indicating a predicate "have a type", and the type is identified by one URI. This expresses that the entity of the node 131a is an organization type.

The node 131c corresponds to an entity of a corporate type of the corporate number data set, and is identified by one URI. The nodes 131a and 131c are connected by an edge from the node 131a to the node 131c. This edge corresponds to a link indicating a predicate "have a type", and the type is identified by one URI. This expresses that the entity of the node 131a is a corporate type of the corporate number data set.

The node 131d corresponds to a literal which is a specific character string. The nodes 131a and 131d are connected by an edge from the node 131a to the node 131d. This edge corresponds to a link indicating a predicate "have identification information", and the type is identified by one URI. This expresses that the entity of the node 131a has the corporate number indicated by the character string of the node 131d. The node 131e corresponds to a literal which is a specific value. The nodes 131a and 131e are connected by an edge from the node 131a to the node 131e. This edge corresponds to a link indicating a predicate "have a label", and the type is identified by one URI. This expresses that the entity of the node 131a has the business name indicated by the character string of the node 131e.

The node 131f is a blank node that does not include a URI or a literal. A blank node is sometimes used, when there is a need for a higher-rank node for integrating a plurality of lower-rank nodes, but it is not important enough to give a unique URI to the higher-rank node. The node 131f corresponds to a concept "the head office location of a corporation". The nodes 131a and 131f are connected by an edge from the node 131a to the node 131f. This edge corresponds to a link indicating a predicate "have a registered site", and the type is identified by one URI. The node 131g is a blank node corresponding to a concept "location". The nodes 131f and 131g are connected by an edge from the node 131f to the node 131g. This edge corresponds to a link indicating a predicate "address", and the type is identified by one URI.

The nodes 131h, 131i, and 131j correspond to literals which are specific character strings. The nodes 131g and 131h are connected by an edge from the node 131g to the node 131h. This edge corresponds to a link indicating a predicate "region", and the type is identified by one URI. The region is a large administrative section, including the prefectures of Japan, for example. The nodes 131g and 131i are connected by an edge from the node 131g to the node 131i. This edge corresponds to a link indicating a predicate "locality", and the type is identified by one URI. The locality is a small administrative section, including cities, wards, towns, and villages (cities, towns, villages, and special wards) of Japan, for example. The nodes 131g and 131j are connected by an edge from the node 131g to the node 131j. This edge corresponds to a link indicating a predicate "street", and the type is identified by one URI. Although the region, the locality, and the street may be identified by URI, the region, the locality, and the street are represented by literals in FIG. 5. This expresses that the entity of the node 131a has a head office location address represented by the character strings of the nodes 131h, 131i, and 131j.

The node 131k corresponds to an entity of a specific company included in the DBpedia, and is identified by one URI. The node 131a and the node 131k indicate practically the same company. However, the node 131a belongs to the corporate number data set, and the node 131k belongs to the data set of the DBpedia, and thus different entities indicating the same company are defined. As described above, different data sets include different entities indicating practically the same real body. In this case, a correspondence relationship is expressed by giving a link between the different entities of different data sets.

The nodes 131a and 131k are connected by an edge from the node 131a to the node 131k. This edge indicates that the node 131k that belongs to the data set of the DBpedia corresponds to the node 131a that belongs to the corporate number data set. The node 131l corresponds to a literal which is a specific character string. The nodes 131k and 131l are connected by an edge from the node 131k to the node 131l. This edge corresponds to a link indicating a predicate "have a label", and the type is identified by one URI. This expresses that the entity of the node 131k has the company name indicated by the character string of the node 131l. The character string of the node 131l may differ from the node 131e.

FIG. 6 illustrates a description example of RDF data. RDF data 132 indicates a part of the RDF data stored in the RDF data memory unit 111, and corresponds to the graph 131 of FIG. 5. The RDF data 132 of FIG. 6 describes a triple composed of a subject, a predicate, and an object in a turtle format. However, the triple may be described in another format, such as an RDF/XML (Extensible Markup Language) format. In the RDF data 132, a URI is described by using angled brackets (< and >). However, when a name space is defined in a part of a URI, the URI is sometimes described without using angled brackets. Also, a character string as a literal is described by using double quotations.

The first line of the RDF data 132 includes the URI of the node 131a as a subject. The second line of the RDF data 132 includes a URI meaning "type" as a predicate, and includes the URIs of the nodes 131b and 131c as objects. The third line of the RDF data 132 includes a URI meaning "identification information" as a predicate, and includes the literal of the node 131d as an object. The fourth line of the RDF data 132 includes a URI meaning "label" as a predicate, and includes the literal of the node 131e as an object.

The fifth line of the RDF data 132 includes a URI meaning "head office location" as a predicate. The object corresponding to this predicate is the entirety from the sixth line to the ninth line. The sixth line of the RDF data 132 includes a URI meaning "address" as a predicate. The object corresponding to this predicate is the entirety from the seventh line to the ninth line. The seventh line of the RDF data 132 includes a URI meaning "prefecture" as a predicate, and includes the literal of the node 131h as an object. The eighth line of the RDF data 132 includes a URI meaning "city, ward, town, and village" as a predicate, and includes the literal of the node 131i as an object. The ninth line of the RDF data 132 includes a URI meaning the part after city, ward, town, and village name, such as an address number, as a predicate, and includes the literal of the node 131j as an object.

The tenth line of the RDF data 132 includes a URI meaning "correspondence relationship of content" as a predicate, and includes the URI of the node 131k as an object. The eleventh line of the RDF data 132 includes the URI of the node 131k as a subject. The twelfth line of the RDF data 132 includes a URI meaning "label" as a predicate, and includes the literal of the node 131l as an object.

FIG. 7 illustrates an example of a query template. A query template 133 is included in one of the gadgets stored in the gadget memory unit 112. The query template 133 includes a parameter "%URI%" and variables "?number", "?name", "?site", "?pref", "?city", and "?street".

The parameter "%URI%" is a parameter to which a URI of an entity representing a company in the corporate number data set is assumed to be assigned. The query template 133 is to extract three items of basic information of an entity from the corporate number data set, with regard to the entity indicated by the URI assigned to the parameter "%URI%". The three items of basic information include a corporate number, a business name, and a head office location. A query for retrieving the three items of basic information of a company indicated by the URI is generated by replacing the parameter "%URI%" described in the query template 133 by a specific URI.

The variable "?number" indicates a corporate number. The variable "?name" indicates a business name. The variable "?site" indicates a head office location. The variable "?pref" indicates a prefecture name included in the head office location. The variable "?city" indicates a city, ward, town, or village name included in the head office location. The variable "?street" indicates a street name included in the head office location.

The query template 133 defines five data items corresponding to the variables "?number", "?name", "?pref", "?city", and "?street", as the data items included in a retrieval result. Thus, when the query generated from the query template 133 is executed, a set of corporate number, business name, prefecture name, city, ward, town, and village name, and street name, which satisfy a predetermined look-up condition, is extracted as a retrieval result.

The query template 133 defines a look-up condition in a triple format. The look-up condition includes a condition that: the subject is "%URI%"; the predicate is a link meaning identification information; and the object is "?number". In addition, the look-up condition includes a condition that: the subject is "%URI%"; the predicate is a link meaning a label; and the object is "?name". In addition, the look-up condition includes a condition that: the subject is "%URI%"; the predicate is a link meaning a head office location; and the object is "?site".

In addition, the look-up condition includes a condition that: the subject is "?site"; the predicate is a link meaning an address; and the object is a blank node. In addition, the look-up condition includes a condition that: the subject is the above blank node; the predicate is a link meaning a prefecture name; and the object is "?pref". In addition, the look-up condition includes a condition that: the subject is the above blank node; the predicate is a link meaning a city, ward, town, and village name; and the object is "?city". In addition, the look-up condition includes a condition that: the subject is the above blank node; the predicate is a link meaning a street name; and the object is "?street". A set of values of the variables "?number", "?name", "?pref", "?city", and "?street" that satisfy all of the look-up conditions is extracted from the corporate number data set.

FIG. 8 illustrates an example of a setting table. A setting table 134 is stored in the setting information memory unit 113. The setting table 134 includes the fields of page ID, focus type, gadget ID, search condition, and end condition.

Identification information of a web page is set in the field of page ID. A type of a focused entity that the user may designate on the web page is set in the field of focus type. A plurality of focus types may be set for one web page. Identification information of a gadget to be located in the web page is set in the field of gadget ID. A plurality of gadget IDs may be set for one web page. A condition of a link to be used to search for a related entity from a focused entity is set in the field of search condition. A condition for ending the search for a related entity is set in the field of end condition. The search condition and the end condition are set for each combination of the page ID and the gadget ID.

For example, the type of a company entity included in the data set of DBpedia is set as the focus type. In addition, the identification information of the gadget including the aforementioned query template 133 is set as the gadget ID. In this case, the type of the focused entity differs from the type of the entity assumed by the query template 133, and thus the search condition and the end condition are set to search for an appropriate related entity.

For example, "^<http://xmlns.com/foaf/0.1/primaryTopic>" is set as the search condition. This means tracing a link of the type "primaryTopic" in the opposite direction once, that is, setting the entity having this link with the focused entity as a candidate of the related entity. In some cases, the search condition only allows the link of a specific type, and does not allow the link of other types. In other cases, the search condition does not allow the link of a specific type, and allows the link of other types. Furthermore, "hasType(org:Organization) && hasType(14a:Corporate)" is set as the end condition, for example. This means detecting the entity of the organization type and of the corporate type of the corporate number data set as the related entity.

Note that the search condition may be described by using a regular expression. "(owl:sameAs|foaf:primaryTopic)*" is conceived as another example of search condition. This means allowing only the link of the type "owl:sameAs" and the link of the type "foaf:primaryTopic" to be traced from the focused entity for an arbitrary number of times. The type of the link described in the search condition is limited to a link that means the sameness of the real body indicated by the entities, in order to prevent the expansion of the search area, in some cases.

FIG. 9 illustrates a query example of the second embodiment. Here, it is assumed that the user has designated the entity of the node 131k of FIG. 5 as the focused entity. The designated focused entity is an entity that belongs to the data set of the DBpedia and is not an entity that belongs to the corporate number data set, and thus does not satisfy the end condition in the setting table 134.

Thus, the terminal device 100 traces links from the focused entity in accordance with the search condition in the setting table 134, and searches for the related entity that satisfies the end condition. Then, the terminal device 100 detects the entity of the node 131a of FIG. 5 as the related entity. In the second embodiment, the terminal device 100 assigns the URI of the detected related entity, to the parameter "%URI%" of the query template 133 of FIG. 7. Thereby, a query 135 is generated. Starting from the entity of the node 131a, the query 135 retrieves three items of basic information of the company indicated by the entity.

FIG. 10 illustrates an example of a query result table. When the query 135 is executed to the RDF data 132, a query result table 136 is generated. Although the execution result of the query 135 is described in a table form in FIG. 10, an execution result described in another form may be output.

The query result table 136 includes data fields of "number", "name", "pref", "city", and "street". The literal (corporate number) of the node 131d reached from the node 131a is output as the value of the data field "number". The literal (business name) of the node 131e reached from the node 131a is output as the value of the data field "name". The literal (prefecture name) of the node 131h reached from the node 131a is output as the value of the data field "pref". The literal (city, ward, town, and village name) of the node 131i reached from the node 131a is output as the value of the data field "city". The literal (street name) of the node 131j reached from the node 131a is output as the value of the data field "street".

Figure 11:
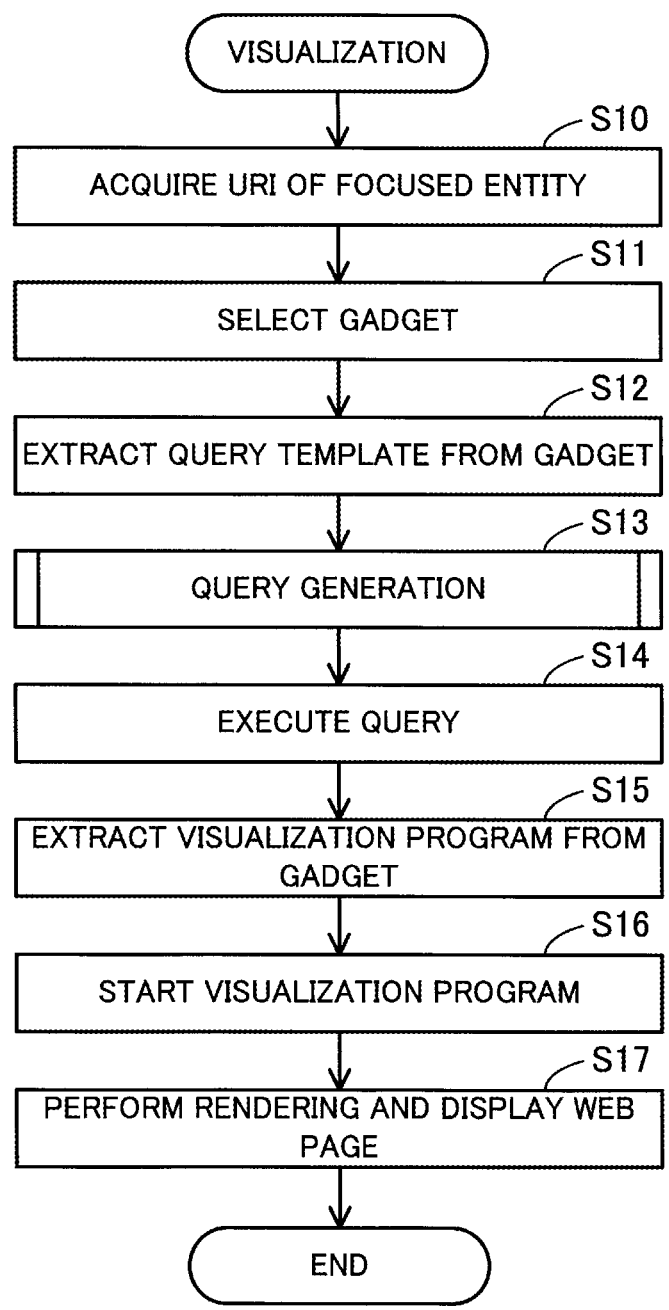
FIG. 11 is a flowchart illustrating a procedure example of visualization.

Next, a process procedure of the terminal device 100 will be described. FIG. 11 is a flowchart illustrating a procedure example of visualization.

(S10) The gadget selection unit 121 detects user operation on a web page, and acquires the URI of the focused entity designated by the user. For example, the gadget selection unit 121 acquires the URI of a company entity that belongs to the data set of the DBpedia.

(S11) The gadget selection unit 121 selects the gadget associated with the web page on which the user operation is detected and the type of the focused entity indicated by the URI that the gadget selection unit 121 has acquired in step S10, with reference to the setting table 134 stored in the setting information memory unit 113.

(S12) The query template extraction unit 122 extracts the query template included in the gadget selected in step S11, from the gadget memory unit 112. For example, the query template extraction unit 122 extracts the query template 133.

(S13) The related entity searching unit 123 searches the RDF data memory unit 111 storing the RDF data, for a related entity. The query generation unit 124 generates a query by using the search result of the related entity and the query template extracted in step S12. The detail of the query generation will be described later.

(S14) The query execution unit 125 executes the query generated in step S13 to the RDF data stored in the RDF data memory unit 111, in order to generate retrieval result data. For example, the query execution unit 125 generates the query result table 136.

(S15) The visualization program starting unit 126 extracts the visualization program included in the gadget selected in step S11, from the gadget memory unit 112. For example, the visualization program starting unit 126 extracts a program for setting a corporate number, a business name, and a head office location in a tabulated list, and a program for setting a pin indicating the head office location in a map.

(S16) The visualization program starting unit 126 starts the visualization program extracted in step S15, by supplying the retrieval result data of step S14 to the visualization program. Display content is generated by visualizing the retrieval result data by the visualization program. The display content includes pictorial data, such as a graph indicating a relationship between a plurality of numerical values, a map with a pin, and a tabulated list. For example, the visualization program starting unit 126 acquires a tabulated list that describes a corporate number, a business name, and a head office location, as well as a map with a pin indicating the head office location.

(S17) The rendering unit 127 displays a web page including the display content of step S16 on the display 41, by performing rendering of the web page.

Figure 12:
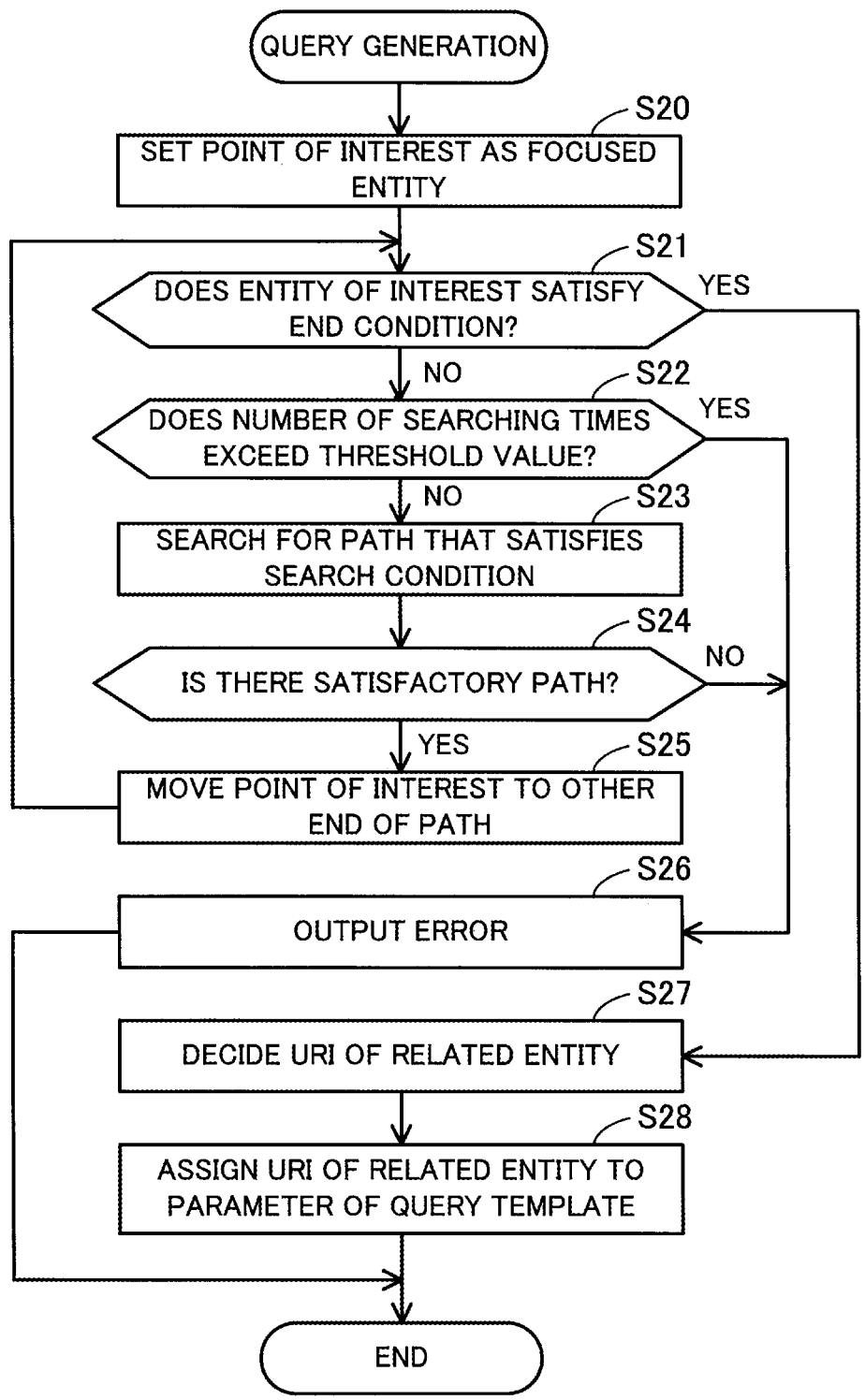
FIG. 12 is a flowchart illustrating a procedure example of query generation of the second embodiment.

FIG. 12 is a flowchart illustrating a procedure example of query generation of the second embodiment. This query generation is executed in above step S13.

(S20) The related entity searching unit 123 sets the entity of interest (the point of interest or the entity of interest) as the focused entity of step S10.

(S21) The related entity searching unit 123 determines whether the entity of interest satisfies the end condition in the setting table 134 stored in the setting information memory unit 113. For example, the related entity searching unit 123 determines whether the type of the entity of interest is a corporate type of the corporate number data set (for example, whether there is a link from the entity of interest to a corporate entity of the corporate number data set). The process proceeds to step S27 if the end condition is satisfied, and the process proceeds to step S22 if the end condition is not satisfied.

(S22) The related entity searching unit 123 compares the number of times of searching for the related entity and moving the point of interest (the number of execution times of steps S23 to S25) with a threshold value, and determines whether the number of searching times exceeds the threshold value. The process proceeds to step S26 if the number of searching times exceeds the threshold value, and the process proceeds to step S23 if the number of searching times is equal to or smaller than the threshold value.

(S23) The related entity searching unit 123 searches for a path that satisfies the search condition in the setting table 134 stored in the setting information memory unit 113 and has not been selected yet, from among the paths that trace one or more links from the focused entity. One or more links are traced in the forward direction in some cases, and are traced in the opposite direction in other cases. A predetermined searching algorithm, such as breadth-first search, is used in the search for the path that satisfies the search condition. Preferably, the end condition is checked preferentially from the entity closer to the focused entity (the entity within a smaller number of hops from the focused entity). For example, the related entity searching unit 123 selects a path that reaches a corporate entity included in the corporate number data set from the company entity included in the data set of the DBpedia.

(S24) The related entity searching unit 123 determines whether a new path that satisfies the search condition is found in step S23. The process proceeds to step S25 if the new path exists, and the process proceeds to step S26 if the new path does not exist.

(S25) The related entity searching unit 123 moves the point of interest to the entity at the other end of the path of step S23. Then, the process proceeds to step S21.

(S26) The related entity searching unit 123 determines that the related entity that satisfies the search condition and the end condition does not exist around the focused entity of step S10, and outputs an error. In this case, following steps S14 to S16 are not executed with respect to the gadget that causes the error, and thus display content is not generated.

(S27) The related entity searching unit 123 acquires the URI of the entity of current interest, and decides it as the URI of the related entity (provisional focused entity).

(S28) The query generation unit 124 assigns the URI of the related entity of step S27 to the parameter of the query template extracted in step S12. For example, the query generation unit 124 replaces the character string "%URI%" by the URI of the related entity.

According to the information processing system of the second embodiment, when the designated focused entity satisfies the end condition corresponding to the query template, the URI of the focused entity is assigned to the parameter of the query template, in order to generate a query. On the other hand, when the focused entity does not satisfy the end condition corresponding to the query template, the related entity that satisfies the end condition is searched for from the RDF data in accordance with the search condition. Then, the URI of the related entity is assigned to the parameter of the query template, in order to generate a query.

Thereby, even when the focused entity of a different type from the type assumed by the parameter of the query template is designated, the query template is utilizable, and it is needless to prepare individual query templates for different focused entities. For example, it is assumed that there are m types of data to be retrieved, and that there are n types of focused entities. When individual queries are prepared for each of the different focused entities, n×m query templates are to be created. In contrast, according to the second embodiment, m query templates are satisfactory to be prepared. This improves the creation efficiency of the software that retrieves and visualizes the target data from the linked data. For example, a web page in which the type of the focused entity is changed is implemented by utilizing an existing gadget.

Third Embodiment

Next, a third embodiment will be described. The differences from the second embodiment are described mainly, and the same parts as the second embodiment may be omitted.

The information processing system of the third embodiment differs from the second embodiment in the method for generating a query from the search result of the related entity and the query template. The information processing system of the third embodiment is implemented by using the same hardware configuration and software configuration as FIGS. 2 to 8, and 10. Also, the terminal device of the third embodiment is capable of executing the visualization processing by the same procedure as FIG. 11. Thus, the same reference signs as FIGS. 2 to 8, 10, and 11 are used in the following description of the third embodiment.

FIG. 13 illustrates an example of rewriting a query template. In the third embodiment, the terminal device 100 rewrites the query template 133 to make it temporarily possible to assign the URI of the focused entity, instead of directly assigning the URI of the related entity that differs from the focused entity to the query template 133. A query template 137 is obtained by rewriting the query template 133.

The query template 137 includes a parameter "%URI%" and variables "?uri", "?number", "?name", "?site", "?pref", "?city", and "?street". Unlike the original query template 133, it is assumed that the URI of the entity representing a company in the data set of the DBpedia is assigned to the parameter "%URI%" of the query template 137. The variable "?uri" is not used in the original query template 133, but is added at the time of rewriting. The variable "?uri" indicates the URI of the entity representing a company in the corporate number data set, and corresponds to the parameter of the original query template 133.

A query for retrieving three items of basic information relevant to the entity of the corporate number data set that corresponds to the URI of the entity of the DBpedia is generated, by assigning the URI of the entity of the DBpedia to the parameter "%URI%" described in the query template 137.

The query template 137 is generated from the query template 133, as described next. In the search for a related entity, a path history including links traced to reach the related entity from the focused entity is recorded. The path including one or more traced links arranged in order is represented by "p". The terminal device 100 defines a new variable that is not used in the query template 133, and replaces the parameter "%URI%" of the query template 133 by the new variable. Also, the terminal device 100 adds a triple composed of the subject "%URI%", the predicate p, and the new variable as the object, to the look-up condition.

Thereby, the focused entity and the entity of search starting point are linked to each other. For example, a statement "%URI% ^<http://wxmlns.com/foaf/0.1/primaryTopic>?uri." is added. This indicates that the entity of the search starting point is reached by tracing the link of primaryTopic from the focused entity in the opposite direction.

FIG. 14 illustrates a query example of the third embodiment. Here, it is assumed that the user has designated the entity of the node 131k of FIG. 5 as the focused entity. The designated focused entity belongs to the data set of the DBpedia, does not belong to the corporate number data set, and thus does not satisfy the end condition in the setting table 134.

Thus, the terminal device 100 traces the link from the focused entity in accordance with the search condition, and detects the entity of the node 131a of FIG. 5 as a related entity. In the third embodiment, the terminal device 100 rewrites the query template 133 into the query template 137 by using the path that reaches the related entity from the focused entity. Then, the terminal device 100 assigns the URI of the focused entity designated at first, to the parameter "%URI%" of the query template 137. Thereby, a query 138 is generated. Moving from the entity of the node 131k to the entity of the node 131a, the query 138 retrieves three items of basic information with regard to the entity of the node 131a.

Figure 15:
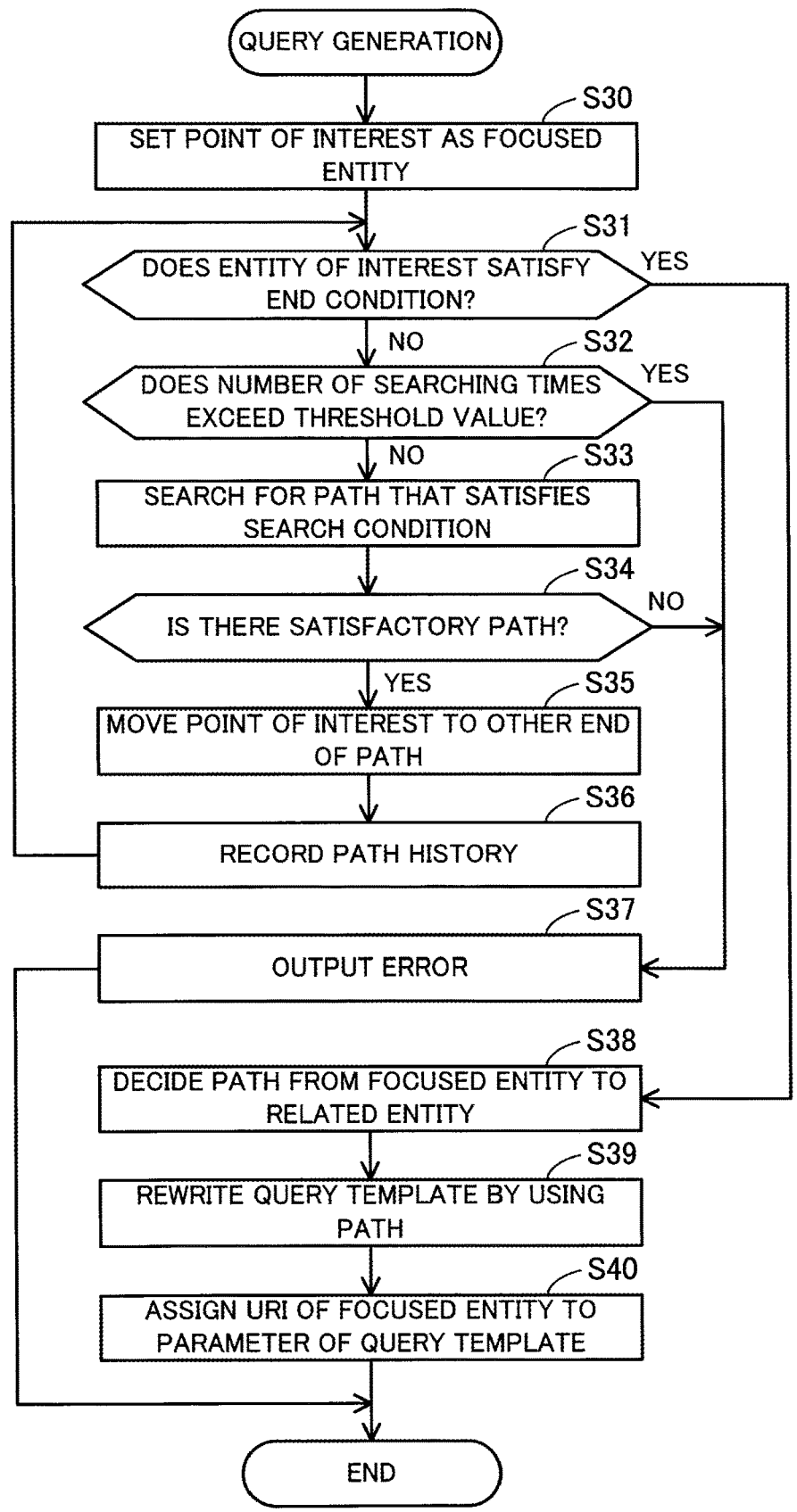
FIG. 15 is a flowchart illustrating a procedure example of query generation of the third embodiment.

FIG. 15 is a flowchart illustrating a procedure example of query generation of the third embodiment. This query generation is executed in above step S13.

(S30) The related entity searching unit 123 sets the entity of interest (the point of interest or the entity of interest) as the focused entity of step S10.

(S31) The related entity searching unit 123 determines whether the entity of interest satisfies the end condition in the setting table 134. The process proceeds to step S38 if the end condition is satisfied, and the process proceeds to step S32 if the end condition is not satisfied.

(S32) The related entity searching unit 123 compares the number of times of searching for the related entity and moving the point of interest (the number of execution times of steps S33 to S36) with a threshold value, and determines whether the number of searching times exceeds the threshold value. The process proceeds to step S37 if the number of searching times exceeds the threshold value, and the process proceeds to step S33 if the number of searching times is equal to or smaller than the threshold value.

(S33) The related entity searching unit 123 searches for a path that satisfies the search condition in the setting table 134 and has not been selected yet, from among the paths that trace one or more links from the focused entity. For example, a predetermined searching algorithm, such as breadth-first search, is used.

(S34) The related entity searching unit 123 determines whether a new path that satisfies the search condition is found in step S33. The process proceeds to step S35 if the new path exists, and the process proceeds to step S37 if the new path does not exist.

(S35) The related entity searching unit 123 moves the point of interest to the other end of the path.

(S36) The related entity searching unit 123 records a path history indicating a path that reaches the entity of interest from the focused entity. The path history is the information that lists the URIs of one or more links in ascending order of distance to the focused entity, for example. When the entity of interest after the movement is reached by tracing one additional link from the entity of interest before the movement, the URI of the traced link is added at the end of the path history before the movement. Then, the process proceeds to step S31.

(S37) The related entity searching unit 123 determines that the related entity that satisfies the search condition and the end condition does not exist around the focused entity of step S10, and outputs an error. In this case, following steps S14 to S16 are not executed with respect to the gadget that causes the error, and thus display content is not generated.

(S38) The related entity searching unit 123 decides the entity of current interest as the related entity, decides the path from the focused entity to the related entity, and outputs the path history indicating the decided path.

(S39) The query generation unit 124 rewrites the query template extracted in step S12, by using the path indicated by the path history acquired from the related entity searching unit 123. For example, the query generation unit 124 replaces the parameter of the original query template by an unused variable. In addition, the query generation unit 124 adds a look-up condition in which the subject is a parameter, the predicate is the string of the URIs of one or more links included in the path, and the object is the above variable.

(S40) The query generation unit 124 assigns the URI of the focused entity of step S10 to the parameter of the query template rewritten in step S39.

According to the information processing system of the third embodiment, when the designated focused entity satisfies the end condition corresponding to the query template, the URI of the focused entity is assigned to the parameter of the query template, in order to generate a query. On the other hand, when the focused entity does not satisfy the end condition corresponding to the query template, a related entity that satisfies the end condition is searched for from the RDF data in accordance with the search condition. Then, the query template is rewritten to include the information of the path that reaches the related entity from the focused entity, and the URI of the focused entity is assigned to the parameter of the query template, in order to generate a query. Thereby, the same effect as the second embodiment is obtained.

In one aspect, the creation efficiency of the software for extracting and visualizing the relevant data is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to execute a process comprising:
    accepting designation of a first entity included in a database that includes a plurality of entities and a plurality of links indicating relationships between the plurality of entities, each of the plurality of entities having an entity type, the designated first entity having a first entity type;
    acquiring a query template that describes a look-up condition for searching the database, the query template including a parameter to which identification information of one of the plurality of entities is to be assigned, and acquiring an entity type condition indicating a second entity type of the parameter;
    generating a first query from the query template by assigning first identification information of the designated first entity to the parameter, in response to determining that the first entity type is identical to the second entity type;
    selecting a second entity that is coupled to the designated first entity via one or more links in the database and has the second entity type from among the plurality of entities, in response to determining that the first entity type is not identical to the second entity type, and generating a second query based on second identification information of the selected second entity and the query template; and
    retrieving data to be used in display processing from the database by using generated one of the first query and the second query.

2. The non-transitory computer-readable storage medium according to claim 1, wherein
    the generating of the second query includes generating the second query by assigning the second identification information of the selected second entity to the parameter instead of the first identification information of the designated first entity.

3. The non-transitory computer-readable storage medium according to claim 1, wherein
    the generating of the second query includes generating path information indicating a path that reaches the selected second entity from the designated first entity, and generating the second query based on the first identification information of the designated first entity, the path information, and the query template.

4. The non-transitory computer-readable storage medium according to claim 3, wherein
    the generating of the second query includes rewriting the query template by replacing the parameter by a variable and inserting a statement for associating another parameter with the path information and the variable, and assigning the first identification information of the designated first entity to the another parameter of the rewritten query template.

5. The non-transitory computer-readable storage medium according to claim 1, wherein
    the acquiring of the entity type condition further includes acquiring a search condition indicating a condition of a link to be used in search for an entity that satisfies the entity type condition, and
    the selecting includes selecting the second entity from among entities coupled to the designated first entity via one or more links that satisfy the search condition.

6. A display method comprising:
    accepting, by a processor, designation of a first entity included in a database that includes a plurality of entities and a plurality of links indicating relationships between the plurality of entities, each of the plurality of entities having an entity type, the designated first entity having a first entity type;
    acquiring, by the processor, a query template that describes a look-up condition for searching the database, the query template including a parameter to which identification information of one of the plurality of entities is to be assigned, and acquiring an entity type condition indicating a second entity type of the parameter;
    generating, by the processor, a first query from the query template by assigning first identification information of the designated first entity to the parameter, in response to determining that the first entity type is identical to the second entity type;
    selecting, by the processor, a second entity that is coupled to the designated first entity via one or more links in the database and has the second entity type from among the plurality of entities, in response to determining that the first entity type is not identical to the second entity type, and generating a second query based on second identification information of the selected second entity and the query template; and
    retrieving, by the processor, data to be used in display processing from the database by using generated one of the first query and the second query.

7. A display apparatus comprising:
    a memory configured to store a query template that describes a look-up condition for searching a database that includes a plurality of entities and a plurality of links indicating relationships between the plurality of entities, each of the plurality of entities having an entity type, the query template including a parameter to which identification information of one of the plurality of entities is to be assigned, and to store an entity type condition indicating a second entity type of the parameter; and
    a processor configured to perform a process including:
    accepting designation of a first entity among the plurality of entities, the designated first entity having a first entity type;
    generating a first query from the query template by assigning first identification information of the designated first entity to the parameter, in response to determining that the first entity type is identical to the second entity type;
    selecting a second entity that is coupled to the designated first entity via one or more links in the database and has the second entity type from among the plurality of entities in response to determining that the first entity type is not identical to the second entity type, and generating a second query based on second identification information of the selected second entity and the query template; and retrieving data to be used in display processing from the database by using generated one of the first query and the second query.

8. The display method according to claim 6, wherein
the generating of the second query includes generating the second query by assigning the second identification information of the selected second entity to the parameter instead of the first identification information of the designated first entity.

9. The display method according to claim 6, wherein
the generating of the second query includes generating path information indicating a path that reaches the selected second entity from the designated first entity, and generating the second query based on the first identification information of the designated first entity, the path information, and the query template.

10. The display method according to claim 9, wherein
the generating of the second query includes rewriting the query template by replacing the parameter by a variable and inserting a statement for associating another parameter with the path information and the variable, and assigning the first identification information of the designated first entity to the another parameter of the rewritten query template.

11. The display method according to claim 6, wherein
the acquiring of the entity type condition further includes acquiring a search condition indicating a condition of a link to be used in search for an entity that satisfies the entity type condition, and
the selecting includes selecting the second entity from among entities coupled to the designated first entity via one or more links that satisfy the search condition.

\* \* \* \* \*